United States Patent
Ros

(10) Patent No.: US 9,654,325 B2
(45) Date of Patent: May 16, 2017

(54) METHOD OF RECEPTION AND RECEIVER FOR SINGLE-CARRIER CYCLIC WAVEFORM CODED SERIAL DIGITAL TRANSMISSION

(71) Applicant: CENTRE NATIONAL D'ÉTUDES SPATIALES C N E S, Paris (FR)

(72) Inventor: Benjamin Ros, Roques (FR)

(73) Assignee: CENTRE NATIONAL D'ETUDES SPATIALES C N E S, Paris (FR)

( * ) Notice: Subject to any disclaimer, the term of this patent is extended or adjusted under 35 U.S.C. 154(b) by 0 days.

(21) Appl. No.: 15/029,820

(22) PCT Filed: Oct. 15, 2014

(86) PCT No.: PCT/FR2014/052628
§ 371 (c)(1),
(2) Date: Apr. 15, 2016

(87) PCT Pub. No.: WO2015/055952
PCT Pub. Date: Apr. 23, 2015

(65) Prior Publication Data
US 2016/0234052 A1   Aug. 11, 2016

(30) Foreign Application Priority Data
Oct. 18, 2013   (FR) ..................... 13 60177

(51) Int. Cl.
*H04L 27/06* (2006.01)
*H04L 27/26* (2006.01)
(Continued)

(52) U.S. Cl.
CPC ............ *H04L 27/265* (2013.01); *H04B 1/10* (2013.01); *H04B 1/16* (2013.01); *H04B 17/336* (2015.01); *H04L 1/206* (2013.01); *H04L 5/001* (2013.01)

(58) Field of Classification Search
CPC . H04L 27/2607; H04L 1/206; H04L 27/2636; H04L 25/0212; H04L 27/2634;
(Continued)

(56) References Cited

U.S. PATENT DOCUMENTS

2007/0064824 A1* 3/2007 Wang ............... H04L 25/03006
375/260

FOREIGN PATENT DOCUMENTS

FR           2952254 A1     5/2011

OTHER PUBLICATIONS

International Search Report for PCT/FR2014/052628, dated Feb. 17, 2015.
Written Opinion for PCT/FR2014/052628, dated Feb. 17, 2015.

* cited by examiner

*Primary Examiner* — Rahel Guarino
(74) *Attorney, Agent, or Firm* — Meagher Emanuel Laks Goldberg & Liao, LLP

(57) ABSTRACT

The invention relates to a method of receiving digital data transmitted on a coded serial digital transmission modulated on a noisy channel with non-stationary equalization attenuation. Digital data are stored associating a value of quality of transmission with the information elements received, and a mutual information value Ik is computed for each value of the quality of transmission. The value of quality of transmission consists of an equivalent signal/noise plus interference ratio calculated as a function of the method of equalization on the basis of various signal/channel noise ratio values measured for the various temporal symbols of information elements received of the signal received corresponding to one and the same information element and according to interference due to the waveform.

16 Claims, 7 Drawing Sheets

Figure 1:
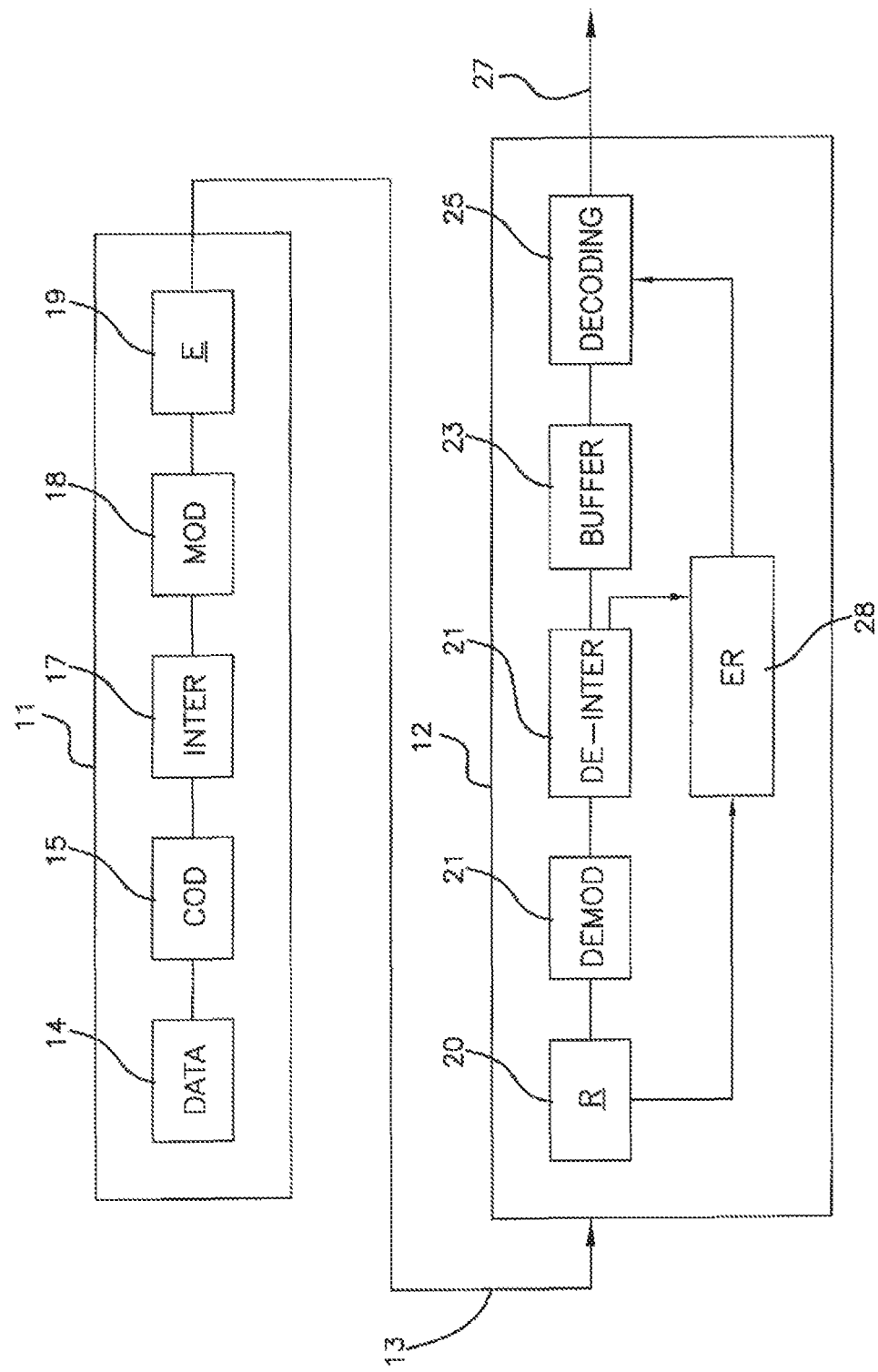

(51) Int. Cl.
    *H04L 1/20*           (2006.01)
    *H04B 17/336*       (2015.01)
    *H04B 1/10*           (2006.01)
    *H04B 1/16*           (2006.01)
    *H04L 5/00*           (2006.01)

(58) Field of Classification Search
    CPC . H04B 17/336; H04B 17/373; H04W 52/241;
                                             H04W 52/24
    USPC .................................................. 375/260, 340
    See application file for complete search history.

METHOD OF RECEPTION AND RECEIVER FOR SINGLE-CARRIER CYCLIC WAVEFORM CODED SERIAL DIGITAL TRANSMISSION

BACKGROUND

Technical Field

The invention relates to a method of reception and a receiver for a coded and modulated serial digital transmission on a noisy channel with non-stationary attenuation exhibiting a waveform chosen from the group of so-called cyclic waveforms, comprising guard intervals repeated from a cyclic manner, and so called single-carrier waveforms, that is to say exhibiting fluctuations corresponding to those of a single carrier. This may in particular entail waveforms such as SC-OFDM (single-carrier orthogonal frequency division multiplexing), EW-SC-OFDM (extended weighted single-carrier orthogonal frequency division multiplexing), SC-FDMA (single-carrier frequency division multiple access), WCP-OFDM (weighted cyclic prefix single-carrier orthogonal frequency division multiplexing), cyclic TDM (cyclic time division multiplexing) etc.

In particular, the SC-OFDM or EW-SC-OFDM known waveforms implementing a division into orthogonal frequencies in the form of multiple sub-carriers but having a single-carrier transmission scheme, may for example be used for the uplink of high-speed wireless data transmissions from mobile terminals (for example LTE, fourth-generation standard for high-speed wireless data transmissions between mobile telephones and/or data terminals), or for the downlink of DVD-NGH (cf. http://www.dvb.org/resources/public/standards/A160_DVB-NGH_Spec.pdf) for the satellite link. Such waveforms exhibit the following advantages in particular:

with respect to an OFDM (orthogonal frequency division multiplexing) waveform:
  lesser sensitivity to synchronization errors (but greater than that of a waveform with linear convolution), reduced peak factor (PAPR);
with respect to a linear convolution: simpler equalization.

The estimation of the performance of the physical layer of such a transmission is important for allowing the planning of the network and the dimensioning, for the optimization of the parameters of the transmission (interleaving, coding, guard intervals, number of sub-carriers, etc.) on channels with very strong spatial correlation, requiring the crossing of large distances by the terminal.

A coded and modulated serial digital transmission on a noisy channel with non-stationary attenuation is established between:

a sender comprising:
  a coding device adapted for generating, on the basis of a stream of bits to be transmitted, termed the sent stream of bits, at least one stream of coded words, termed the sent stream of coded words, resulting from the coding, according to at least one predetermined coding method, of said sent stream of bits,
  a modulation device adapted for generating at least one stream of modulated elements, termed the sent stream of modulated elements, according to a predetermined modulation scheme, each sent stream of modulated elements being representative of at least one part of each sent stream of coded words,
  a device for sending, on a noisy channel with non-stationary attenuation, a signal, termed the sent signal, incorporating a stream of sent symbols representative of each sent stream of modulated elements, and a receiver comprising:
  a receiving device adapted for receiving a signal, termed the received signal, is received by a receiving device, said received signal incorporating a stream of received symbols corresponding to a sent stream of modulated elements on said channel, the received signal exhibiting a waveform chosen from the group of so-called cyclic waveforms, comprising guard intervals repeated in a cyclic manner, and so-called single-carrier waveforms, exhibiting fluctuations corresponding to those of a single carrier, each modulated element being represented by a plurality of received symbols,
  a demodulation device adapted for generating at least one stream of coded words, termed the received stream of coded words, on the basis of each received stream of modulated elements,
  at least one decoding device adapted for generating a stream of bits, termed the received stream of bits, by decoding each received stream of coded words, according to a decoding method corresponding to a coding method implemented by the sender.

The coding of such a digital transmission makes it possible to enhance its reliability. In diverse applications, the transmission channel used, in general of wireless type (radiofrequency and/or microwave frequency, etc.), exhibits a non-stationary attenuation, that is to say one which varies substantially over time during the transmission of each coded word. This phenomenon is enhanced by the presence of at least one interleaver.

Such is the case for example with mobile receiver terminals (for example of GPRS or UMTS, DVB-SH Satellite type) and/or when the coding is of the "turbocode", LDPC or iterative type. Indeed, the channel conditions and its performance may fluctuate as a function of the position of the receiver. Furthermore, when an interleaver is provided, the function of such an interleaver has the effect of reducing the variations of the attenuation which is seen per coded word.

Nonetheless, digital data representative of the variations over time of the attenuation and of the noise of the channel are generally available. These digital data can originate from the known characteristics of the interleaver, or else from statistical characteristics known on the basis of the physical properties of a channel. The data of the channel are estimated on the basis of the signal received either on pilot elements or on modulated elements. The successive signal/noise ratios per coded word are reconstructed on the basis of the interleaver.

In this general context, a problem which arises is that of the prediction of the transmission performance, that is to say of the determination, without carrying out the decoding, of an error rate ER (bit error rate BER and/or word error rate PER) in the received stream of bits as a function of variations of attenuation of the channel during the reception of each coded word.

Such performance prediction must in particular make it possible to optimize the design of said constituent elements, and in particular to choose appropriate protocols to ensure good transmission quality: automatic retransmission request (so-called ARQ technique), optionally hybrid automatic retransmission request (H-ARQ); incremental redundancy (IR); Chase combination; adaptation of the characteristics of the sender and/or of the transmission link: choice of the coding method, power of the signal, modulation scheme, etc. Such performance prediction can also make it possible to avoid overdimensioning the receivers and their antennas.

FR 2 952 254 describes a method of reception and a receiver in which:

digital data are stored making it possible to determine:
at least one value, termed the transmission quality $Q_k$, with formula $c_k^2 \cdot E_s/N_0$, where $c_k$ represents each value of attenuation of the channel over time, k being a temporal index, $E_s$ represents an average energy per modulated element sent and $N_0$ represents a spectral density of Gaussian white noise on the channel,
and the variations over time of said transmission quality $Q_k$ for each received element of the received stream of modulated elements, in a first step, a mutual information value $I_k$ is formulated for each value of said transmission quality $Q_k$, according to a predetermined function of said transmission quality $Q_k$, in a second step, an average $<I_n>$ of mutual information is formulated for each coded word of the received stream of coded words, by averaging the various values of mutual information $I_k$ formulated in the first step for the various values taken by said transmission quality $Q_k$ on said coded word, in a third step, at least one value of the error rate ER of the received stream of bits is formulated without carrying out the decoding for each coded word of the received stream of coded words, on the basis of each value of the mutual information average $<I_n>$ formulated in the second step, and by using stored data representative of variations of an equivalent error rate according to at least one function, termed the standard function, of the signal/noise ratio, each standard function being predetermined for the coding and decoding devices on a channel with additive Gaussian white noise.

This method and this receiver are entirely satisfactory, and in particular make it possible to obtain a performance prediction without carrying out the decoding, while at the same time taking into account the actual variations in attenuation of the channel, and with very accurate results, high reliability and light and fast computations, and therefore optimization of the quality of transmission. They are applicable in particular to transmissions with waveforms of OFDM or FDMA type. However, this performance prediction is not in any way applicable to single-carrier cyclic waveforms for which, by construction, there exists interference between modulated elements, a coded word not necessarily comprising an integer number of modulated elements, preventing a priori any evaluation of transmission quality $Q_k$.

SUMMARY

In this context, the invention is aimed at proposing a method and a receiver incorporating a prediction of the performance of the transmission without carrying out the decoding, as a function of variations in attenuation of the channel during the reception of each coded word, applicable to single-carrier cyclic waveforms, in particular SC-OFDM, EW-SC-OFDM, SC-FDMA, WCP-OFDM, cyclic TDM, and which makes it possible to obtain very accurate results, high reliability and light and fast computations, and therefore optimization of the transmission quality. In particular, the invention is aimed at proposing a method of reception and a receiver incorporating performance prediction applicable to these waveforms and which exhibits the same qualities as the performance prediction described in FR 2 952 254.

The invention is also aimed at proposing such a method and such a receiver allowing performance prediction using solely the known parameters of the waveform of the receiver and while complying with the structure of the real receiver which performs the equalization in the frequency domain before the application of an inverse fast Fourier transform. The invention is also aimed at proposing such a method and such a receiver which allow fast performance prediction, and in particular without requiring the use of an additional Fourier transform operation dedicated solely to this prediction.

Accordingly the invention relates to a method for receiving digital data transmitted on a coded and modulated serial digital transmission on a noisy channel with non-stationary attenuation, in which:

a signal, termed the received signal, is received by a receiving device, said received signal incorporating a stream of temporal symbols of information elements corresponding to a stream of temporal symbols of information elements sent on said channel and representative of information elements corresponding to the data to be transmitted, each information element being represented by a plurality of said temporal symbols, the received signal exhibiting a waveform chosen from the group of so-called cyclic waveforms, comprising guard intervals repeated in a cyclic manner, and so-called single-carrier waveforms, exhibiting fluctuations corresponding to those of a single carrier, a predetermined method of equalization is applied by said receiving device to the temporal symbols of information elements received, at least one stream of coded words, termed the received stream of coded words, is generated by demodulation on the basis of the stream of temporal symbols of information elements received, a stream of bits, termed the received stream of bits, is generated by decoding each received stream of coded words, according to a decoding method corresponding to a coding method implemented when sending on the channel the stream of symbols sent, in which method:
digital data are stored associating a value of transmission quality with the information elements received,
in a first step, a mutual information value Ik is formulated for each value of said transmission quality according to a predetermined function of said transmission quality,
characterized in that said value of transmission quality consists of an equivalent signal/noise plus interference ratio calculated as a function of said equalization method on the basis of various values of signal/noise ratio of the channel which are measured for the various temporal symbols of information elements received of the received signal corresponding to one and the same information element and according to interference due to said waveform.

Advantageously and according to the invention:
in a second step, an average $<I_n>$ of mutual information is formulated for each coded word of the received stream of coded words, by averaging the various mutual information values $I_k$ formulated in the first step for the various values taken by said transmission quality Qk on said coded word, in a third step, at least one value of an error rate ER of the received stream of bits is formulated without carrying out the decoding for each coded word of the received stream of coded words, on the basis of each value of the mutual information average <I$_n$> formulated in the second step, and by using stored data representative of variations of an equivalent error rate according to at least one function, termed the standard function, of the signal/noise ratio, each standard function being predetermined for the coding and decoding devices on a channel with additive Gaussian white noise.

DETAILED DESCRIPTION

In a totally unexpected manner, the inventors have indeed found that it is possible to use such a value of equivalent signal/noise plus interference ratio by way of measurement of the transmission quality within the framework of performance prediction applied to the above-mentioned waveforms, and that it follows from this that all of the subsequent steps of the method for predicting performance by using the mutual information may be strictly unchanged, as described by FR 2 952 254. Indeed, whereas in the method of FR 2 952 254, the transmission quality is calculated for each part of a coded word received corresponding to the received modulated symbols for which the attenuation of the channel remains the same, it turns out that, for single-carrier cyclic waveforms, it is possible to use a value of equivalent signal/noise plus interference ratio for each information element received on the basis of various values of signal/noise ratio of the channel which are measured for the various temporal symbols of information elements received of the received signal corresponding to this information element and according to the interference due to said waveform.

The calculation of the equivalent signal/noise plus interference ratio is chosen according to the invention as a function of the waveform employed and of the method of equalization implemented.

In particular, the equalization method can form the subject of diverse variants (equalization based on minimized mean square error (MMSE) or on Wiener filter, equalization by zero forcing (ZF), etc.).

The invention applies more particularly (although not exclusively) to single-carrier cyclic waveforms comprising a fast Fourier transform applied to the temporal symbols of the received signal so as to produce received blocks with M frequency components. With these waveforms, the information elements are distributed over the various frequency components of the received blocks. The invention applies still more particularly to these waveforms for which the equalization method is applied to the received blocks with M frequency components (in the frequency domain). Indeed, in this case, the equalization method is greatly simplified.

Advantageously and according to the invention, said waveform being chosen from the group of single-carrier waveforms with frequency division on a plurality of M sub-carriers, the received signal exhibiting temporal symbols of N modulated information elements, N being an integer number greater than M, said temporal symbols being separated from one another by guard intervals, the receiving device being adapted for:

deleting the guard intervals,
applying a fast Fourier transform of order N to the temporal symbols of the signal received, and producing blocks, termed received blocks, of frequency components on said sub-carriers,
applying said equalization method to said received blocks so as to produce equalized blocks,
applying an inverse fast Fourier transform to the equalized blocks so as to produce a stream of equalized temporal symbols,
digital data are stored making it possible to determine a value of a signal/noise ratio SNRi for each frequency component of a received block,
said transmission quality consists of one and the same value SINReq of an equivalent signal/noise plus interference ratio calculated as a function of said equalization method on the basis of said values of the signal/noise ratios SNRi for all the frequency components of one and the same received block.

In an advantageous embodiment of the invention, the received signal exhibiting an SC-OFDM waveform without weighting, said value SINReq of the equivalent signal/noise plus interference ratio is calculated according to the following formula (I):

$$\text{SINReq} = \frac{|\alpha|^2}{\frac{1}{M}\sum_{k=0}^{M-1}(|H[k]|^2 + \gamma^{-1})|W[k]|^2 - |\alpha|^2} \quad (I)$$

$$\text{with } \alpha = \frac{1}{M}\sum_{k=0}^{M-1} W[k]H[k]$$

and in which:

H[k] is the gain of the channel calculated by discrete Fourier transformation of a discrete impulse response, W[k] is the transfer function of the equalization and weighting method, and $\tilde{W}[k] = W[k] H[k]$, γ is the mean signal-to-noise ratio (in time/frequency).

More particularly, advantageously and according to the invention, said equalization method being minimized mean square error (MMSE) based or Wiener filter based, said value SINReq of the equivalent signal/noise plus interference ratio is calculated according to the following formula (II):

$$\text{SINReq} = \frac{\beta}{1-\beta} \quad (II)$$

$$\beta = \frac{1}{M}\sum_{k=0}^{M-1} \frac{\gamma_k}{\gamma_k + 1}$$

$$\gamma_k = |H[k]|^2 \gamma.$$

In another advantageous embodiment of the invention, the received signal exhibiting an EW-SC-OFDM waveform comprising an extension of frequencies with weighting, said value SINReq of the equivalent signal/noise plus interference ratio is calculated according to the following formula (III):

$$\text{SINReq} = \frac{|\alpha|^2}{\frac{1}{M}\sum_{k=0}^{M-1}(|\tilde{W}[k]|^2 + \gamma^{-1}|W[k]|^2) - |\alpha|^2} \quad (III)$$

$$\text{with } \alpha = \frac{1}{M}\sum_{k=0}^{M-1} \tilde{W}[k]$$

$$|W[k]|^2 = \begin{cases} |W_0[k]|^2, & \forall k \in I_0 \\ |W_1[k]|^2 + |W_2[k]|^2, & \forall k \in I_1 \end{cases}$$

and in which:
- $I_0$ is the central band of the unweighted frequencies (non-recombination of the sub-carriers), $I_1$ is formed of the end bands $I_{1-1}$ and $I_{1-2}$ of the weighted frequencies (where the sub-carriers are recombined), the low band $I_{1-1}$ being referenced by an index 1, the high band $I_{1-2}$ by an index 2,
- H[k] is the gain of the channel calculated by discrete Fourier transformation of a discrete impulse response,
- W[k] is the transfer function of the equalization and weighting method, and $\tilde{W}[k]=W[k]\,H[k]$,
- $W_0[k]$: is the transfer function of the equalization and weighting method in the central frequency band $I_0$ corresponding to the neutral weighting (no recombination of the sub-carriers),
- $W_1[k]$ and $W_2[k]$ are the transfer functions of the equalization and weighting method respectively in the two frequency bands $I_{1-1}$ and $I_{1-2}$ where the sub-carriers are recombined and weighted,
- γ is the mean signal-to-noise ratio:

$$\gamma = \frac{\sigma_X^2}{\sigma_B^2}$$

with $\sigma_X^2 = \mathbb{E}(|X[k]|^2) = M\sigma_x^2$.

More particularly, advantageously and according to the invention, said equalization method being minimized mean square error (MMSE) based or Wiener filter based, said value SINReq of the equivalent signal/noise plus interference ratio is calculated according to the following formula (IV):

$$SINReq = \frac{\alpha}{1-\alpha}. \quad (IV)$$

Moreover, according to a possible and advantageous variant of the invention, each mutual information value $I_k$ is determined according to the function defined by the following formula (V):

$$I_k(x_k, y_k) = -\log_2(\pi e SINR_{eq}) - \int_{u=-\infty}^{\infty}\int_{v=-\infty}^{\infty} f(u,v)\log_2(f(u,v))du\,dv \quad (V)$$

$$f(u,v) = \frac{1}{M\pi(SINR_{eq})} \sum_{m=0}^{M-1} \exp\left(\frac{-(v - SINR_{eq} \times imag(S'_m))^2}{SINR_{eq}}\right)$$

$$\exp\left(\frac{-(u - SINR_{eq} \times real(S'_m))^2}{SINR_{eq}}\right)$$

$$S'_m = \frac{1}{\sqrt{E_S}} S_m$$

M being the cardinal of the alphabet $A=\{S_0, S_1, \ldots, S_{M-1}\}$ of the modulated symbols.

Advantageously and according to the invention, this analytic formula can be discretized for its evaluation by numerical processing, for example according to the function defined by the following formula (VI):

$$I_k(x_k, y_k) = -\log_2(\pi e SINR_{eq}) - \quad (VI)$$

$$\Delta u \Delta v \sum_{q=-thresh}^{thresh} \sum_{r=-thresh}^{thresh} f(q\Delta u, r\Delta v)\log_2(f(q\Delta u, r\Delta v))$$

$$thresh = \sqrt{-SINR_{eq}\ln(\alpha\sqrt{SINR_{eq}\pi})} +$$

$$Max_{0\leq m \leq M-1}(real(SINR_{eq}S'_m), imag(SINR_{eq}S'_m))$$

and $\Delta u = \Delta v = 2\frac{thresh}{\beta}$

According to another possible and advantageous variant of the invention, each mutual information value $I_k$ is determined according to the function $I_k(b^j_k, y_k)$ of the of the mutual information calculated between the jth bit ($0 \leq j \leq p-1$) of the symbol $x_k$ sent and the symbol received $y_k$, this function being defined by the following formula (VII):

$$I_k(b^j_k, y_k) = -\int_{u=-\infty}^{\infty}\int_{v=-\infty}^{\infty} f(u,v)\log_2(f(u,v))du\,dv + \quad (VII)$$

$$\int_{u=-\infty}^{\infty}\int_{v=-\infty}^{\infty} g_j(u,v)\log_2(g_j(u,v))du\,dv$$

$$f(u,v) = \frac{1}{M\pi(SINR_{eq})} \sum_{m=0}^{M-1} \exp\left(\frac{-(v - SINR_{eq} \times imag(S'_m))^2}{SINR_{eq}}\right)$$

$$\exp\left(\frac{-(u - SINR_{eq} \times real(S'_m))^2}{SINR_{eq}}\right)$$

and $g_j(u,v) = \frac{2}{M\pi(SINR_{eq})}$ $$\sum_{m=0}^{M/2-1} \exp\left(\frac{-(v - SINR_{eq} \times imag(B^{j,0}_m))^2}{SINR_{eq}}\right)$$

$$\exp\left(\frac{-(u - SINR_{eq} \times real(B^{j,0}_m))^2}{SINR_{eq}}\right)$$

$$S'_m = \frac{1}{\sqrt{E_S}} S_m$$

M being the cardinal of the alphabet $A=\{S_0, S_1, \ldots, S_{M-1}\}$ of the modulated symbols, $\{B_m^{j,0}\}0\leq m \leq 2^{p-1}-1$ being the set of normalized symbols $S'_m$ of p bits $0\leq j \leq p-1$, whose bit numbered m equals 0, $\{B_m^{j,1}\}0\leq m \leq 2^{p-1}-1$ being the set of normalized symbols $S'_m$ of p bits $0\leq j \leq p-1$, whose bit numbered m equals 1.

Advantageously and according to the invention, this analytic formula can be discretized for its evaluation by numerical processing, for example according to the function $I_k(b^j_k, y_k)$ defined by the following formula (VIII):

$$I_k(b^j_k, y_k) = \Delta u \Delta v \left(\sum_{q=-thresh}^{thresh}\sum_{r=-thresh}^{thresh} f(q\Delta u, r\Delta v)\log_2(f(q\Delta u, r\Delta v)) + \right. \quad (VIII)$$

$$\left. \sum_{q=-thresh}^{thresh}\sum_{r=-thresh}^{thresh} g_j(q\Delta u, r\Delta v)\log_2(g_j(q\Delta u, r\Delta v))\right)$$

$$thresh = \sqrt{-SINR_{eq}\ln(\alpha\sqrt{SINR_{eq}\pi})} +$$

-continued $$\text{Max}_{0 \leq k \leq M-1}(\text{real}(\text{SINR}_{eq}S'_k), \text{imag}(\text{SINR}_{eq}S'_k))$$

$$\text{and } \Delta u = \Delta v = 2\frac{\text{thresh}}{\beta}.$$

Moreover, advantageously and according to the invention, the values of the signal/noise ratios SNRi for each sub-carrier are values measured over time—in particular by the receiver—in tandem with the reception of the received symbols of the received signal.

Furthermore, advantageously and according to the invention, the values of mutual information $I_k$ and/or of the mutual information average $\langle I_n \rangle$ and/or of each error rate ER of the received stream of bits is(are) formulated by the receiver.

Moreover, advantageously a method according to the invention is also characterized in that a deinterleaving is performed after demodulation of the symbols of the received stream of modulated symbols so as to form each coded word of the received stream of coded words, and in that each value of mutual information $I_k$ and/or of the mutual information average $\langle I_n \rangle$ and/or of the error rate ER of the received stream of bits is formulated for each coded word obtained on completion of such a deinterleaving.

Furthermore, advantageously and according to the invention, for each coded word of the received stream of coded words, a control signal for the decoding device is formulated as a function of each value of the error rate ER of the received stream of bits.

Advantageously and according to the invention, for each coded word of the received stream of coded words, a unique value of the error rate ER of the received stream of bits is formulated on the basis of a unique standard function, and the control signal is adapted for activating the decoding device if said value of the error rate ER of the received stream of bits is less than a predetermined threshold value.

As a variant, advantageously and according to the invention, for each coded word of the received stream of coded words, a plurality of series of values of the error rate ER of the received stream of bits are formulated on the basis of a plurality of standard functions, each standard function corresponding to a decoding method chosen from among a plurality of predetermined decoding methods, and said control signal is formulated so as to activate the decoding device according to the decoding method for which said value of the error rate ER of the received stream of bits is the closest to a predetermined threshold value while being less than this threshold value.

Advantageously and according to the invention, the decoding methods of one and the same plurality of decoding methods differ from one another solely by a number of decoding iterations.

The invention also extends to a receiver for coded and modulated serial digital transmission on a noisy channel with non-stationary attenuation, comprising:

a receiving device adapted for receiving a signal, termed the received signal, incorporating a stream of temporal symbols of information elements corresponding to a stream of temporal symbols of information elements sent on said channel and representative of information elements corresponding to the data to be transmitted, each information element being represented by a plurality of said temporal symbols, the received signal exhibiting a waveform chosen from the group of so-called cyclic waveforms, comprising guard intervals repeated in a cyclic manner, and so-called single-carrier waveforms, exhibiting fluctuations corresponding to those of a single carrier, an equalization device applying a predetermined method of equalization to the temporal symbols of information elements received, a demodulation device adapted for generating at least one stream of coded words, termed the received stream of coded words, on the basis of the stream of temporal symbols of information elements received, a decoding device adapted for generating a stream of bits, termed the received stream of bits, by decoding each received stream of coded words, according to a decoding method corresponding to a coding method implemented when sending the sent stream of modulated symbols on said channel, a device for predicting performance of the channel adapted for formulating at least one value representative of an error rate ER of the received stream of bits, without carrying out the decoding, on the basis of stored digital data making it possible to associate a value of transmission quality with the information elements received, said module for predicting performance of the channel being adapted for:

in a first step, formulating for each value of said transmission quality a mutual information value $I_k$ according to a predetermined function of said transmission quality, characterized in that said device for predicting performance of the channel is adapted to use, by way of value of transmission quality, an equivalent signal/noise plus interference ratio calculated as a function of said equalization method on the basis of various values of signal/noise ratio of the channel which are measured for the various received symbols of the received signal corresponding to one and the same information symbol and according to interference due to said waveform.

A receiver according to the invention is also advantageously characterized in that it is adapted for the implementation of a method according to the invention.

Thus, in a first possible and advantageous embodiment of the invention, said device for predicting performance of the channel is adapted for formulating each mutual information value $I_k$ according to the function defined by formula (V).

Advantageously and according to the invention, said device for predicting performance is adapted for discretizing this analytic formula for its evaluation by numerical processing, that is to say to formulate each mutual information value $I_k$ according to the formula (VI).

In a second possible and advantageous embodiment and according to the invention, said device for predicting performance of the channel is adapted for formulating each mutual information value $I_k$ according to the function defined by the formula (VII).

Advantageously and according to the invention, said device for predicting performance of the channel is adapted for discretizing this analytic formula for its evaluation by numerical processing, that is to say to formulate each mutual information value $I_k$ according to the function $I_k(b^j_k, y_k)$ of the mutual information calculated between the jth bit ($0 \leq j \leq p-1$) of the symbol $x_k$ sent and the symbol received $y_k$, this function $I_k(b^j_k, y_k)$ being defined by the formula (VIII).

A receiver according to the invention is also advantageously adapted for measuring the values of the signal/noise ratios SNRi for each sub-carrier over time in tandem with the reception of the received symbols of the received signal.

Advantageously and according to the invention, said module for predicting performance of the channel is also adapted for:

in a second step, formulating for each coded word of the received stream of coded words a mutual information average $<I_n>$, by averaging the various mutual information values $I_k$ determined in the first step for the various values taken by said transmission quality on said coded word, in a third step, formulating for each coded word of the received stream of coded words, at least one value of the error rate ER of the received stream of bits on the basis of each value of the mutual information average $<I_n>$ determined in the second step, and by using stored data representative of variations of an equivalent error rate according to at least one function, termed the standard function, of the signal/noise ratio, each standard function being predetermined for the coding and decoding devices on a channel with additive Gaussian white noise.

Advantageously and according to the invention, said device for predicting performance is adapted for formulating the values of mutual information $I_k$ and/or of the mutual information average $<I_n>$ and/or of each error rate ER of the received stream of bits for each coded word arising from a deinterleaver module of the demodulation device.

In a first variant embodiment of a receiver according to the invention, said device for predicting performance is adapted for formulating, for each coded word of the received stream of coded words, a control signal for the decoding device as a function of each value of the error rate ER of the received stream of bits. Advantageously and according to the invention, said device for predicting performance of the channel is adapted for formulating, for each coded word of the received stream of coded words:

a unique value of the error rate ER of the received stream of bits on the basis of a unique standard function, and said control signal to activate the decoding device if said value of the error rate ER of the received stream of bits is less than a predetermined threshold value.

In a second variant embodiment of a receiver according to the invention, said device for predicting performance of the channel is adapted for formulating, for each coded word of the received stream of coded words:

a plurality of series of values of the error rate ER of the received stream of bits on the basis of a plurality of standard functions, each standard function corresponding to a decoding method chosen from among a plurality of predetermined decoding methods, and said control signal so as to activate the decoding device according to the decoding method for which said value of the error rate ER of the received stream of bits is the closest to a predetermined threshold value while being less than this threshold value.

The invention extends to a device for coded and modulated serial digital transmission on a noisy channel with non-stationary attenuation between:

a sender comprising:
a coding device adapted for generating, on the basis of a stream of bits to be transmitted, termed the sent stream of bits, at least one stream of coded words, termed the sent stream of coded words, resulting from the coding, according to at least one predetermined coding method, of said sent stream of bits, a modulation device adapted for generating at least one stream of modulated information elements, termed the sent stream of modulated information elements, according to a predetermined modulation scheme, on at least one carrier signal, each sent stream of modulated information elements being representative of at least one part of each sent stream of coded words, a device for sending, on a noisy channel with non-stationary attenuation, a sent signal incorporating a stream of temporal symbols of information elements corresponding to the data to be transmitted, each information element being represented by a plurality of temporal symbols, the sent signal exhibiting a waveform chosen from the group of so-called cyclic waveforms, comprising guard intervals repeated in a cyclic manner, and so-called single-carrier waveforms, exhibiting fluctuations corresponding to those of a single carrier, and a receiver comprising:
a receiving device adapted for receiving a signal, termed the received signal, incorporating a stream of temporal symbols of information elements corresponding to a stream of temporal symbols of information elements sent on said channel, an equalization device applying a predetermined method of equalization to the temporal symbols of information elements received, a demodulation device adapted for generating at least one stream of coded words, termed the received stream of coded words, on the basis of the stream of temporal symbols of information elements received, at least one decoding device adapted for generating a stream of bits, termed the received stream of bits, by decoding each received stream of coded words, according to a decoding method corresponding to a coding method implemented by the sender, characterized in that the receiver is in accordance with the invention and/or implements a method according to the invention.

The inventors have found that the invention makes it possible in practice to obtain performance prediction that is fast and accurate, and in particular considerably more accurate than in all the known earlier procedures, while remaining as fast. This result is surprising, in particular since the equivalent signal/noise plus interference ratio does not correspond to the transmission quality per modulated information element received.

Moreover, these advantages afforded by the invention make it possible to envisage its real-time use at the level of a receiver for single-carrier cyclic waveforms (in particular SC-OFDM, EW-SC-OFDM, SC-FDMA, WCP-OFDM, cyclic TDM) to optimize its operation, and in particular to determine whether or not a coded word received need be decoded and, if appropriate, the minimum number of iterations required to be used by the decoding module, in the case where the latter is of the iterative type (LDPC, turbocode, etc.).

Thus, the invention makes it possible to envisage the embodying of a receiver for these waveforms whose performance is auto-adaptive and minimized as a function of the transmission quality. Such a receiver presents in particular the advantage of exhibiting minimum energy consumption, this being a considerable advantage for onboard receivers embedded in mobile systems, in particular in space systems. Indeed, reducing the energy consumption makes it possible on the one hand to make savings during use, and, on the other hand, to minimize the performance requirements of the energy sources, and therefore their costs, their weight and their bulkiness, or to improve their duration of operation when dealing with an accumulator battery.

The invention extends to a method of coded serial digital transmission on a non-stationary channel incorporating a method of reception according to the invention, as well as to a device for coded serial digital transmission on a non-stationary channel comprising a receiver according to the invention.

The invention extends to a computer program able to be loaded into random-access memory of a computing device, and comprising program code instructions for the execution of the steps of a method according to the invention by said computing device.

It also extends to a computer program product comprising instructions of program code recorded on a medium usable in a computing system, characterized in that it comprises programming means readable by a computing system for executing a method according to the invention.

The invention also relates to a reception method, a receiver, a transmission method and a transmission device characterized in combination by all or some of the characteristics mentioned hereinabove or hereinafter.

Figure 2:
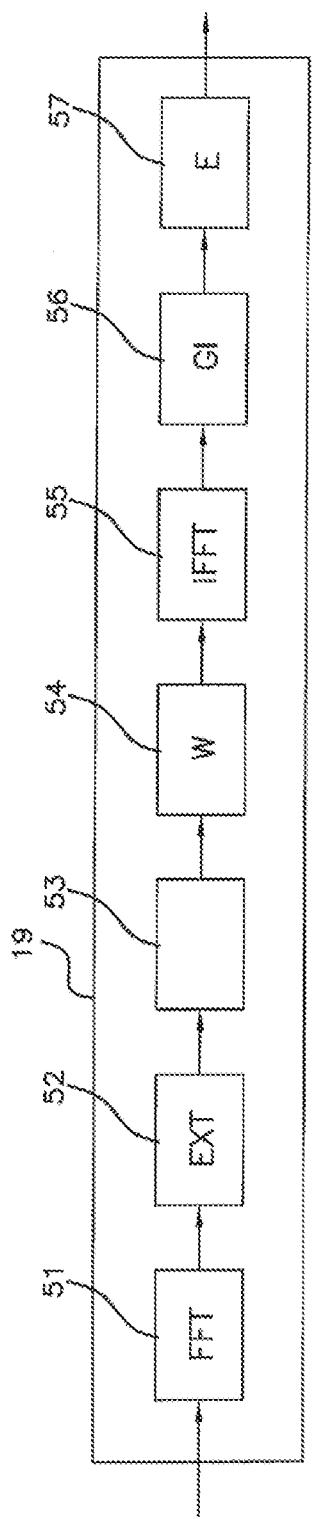
Figure 3:
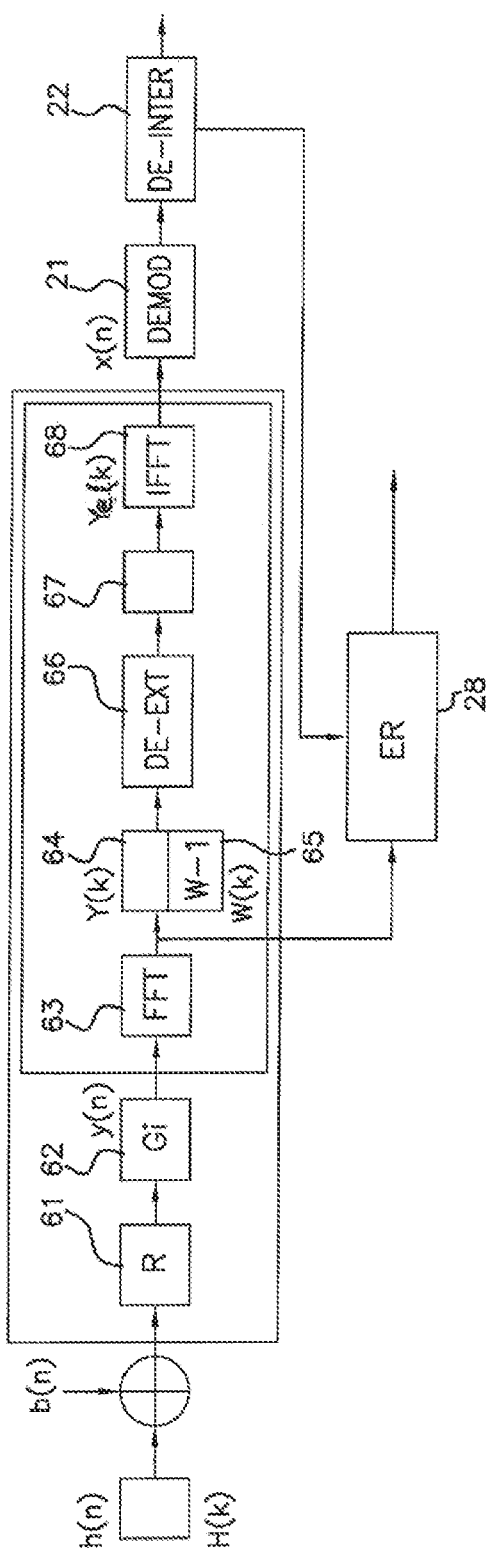
Figure 4:
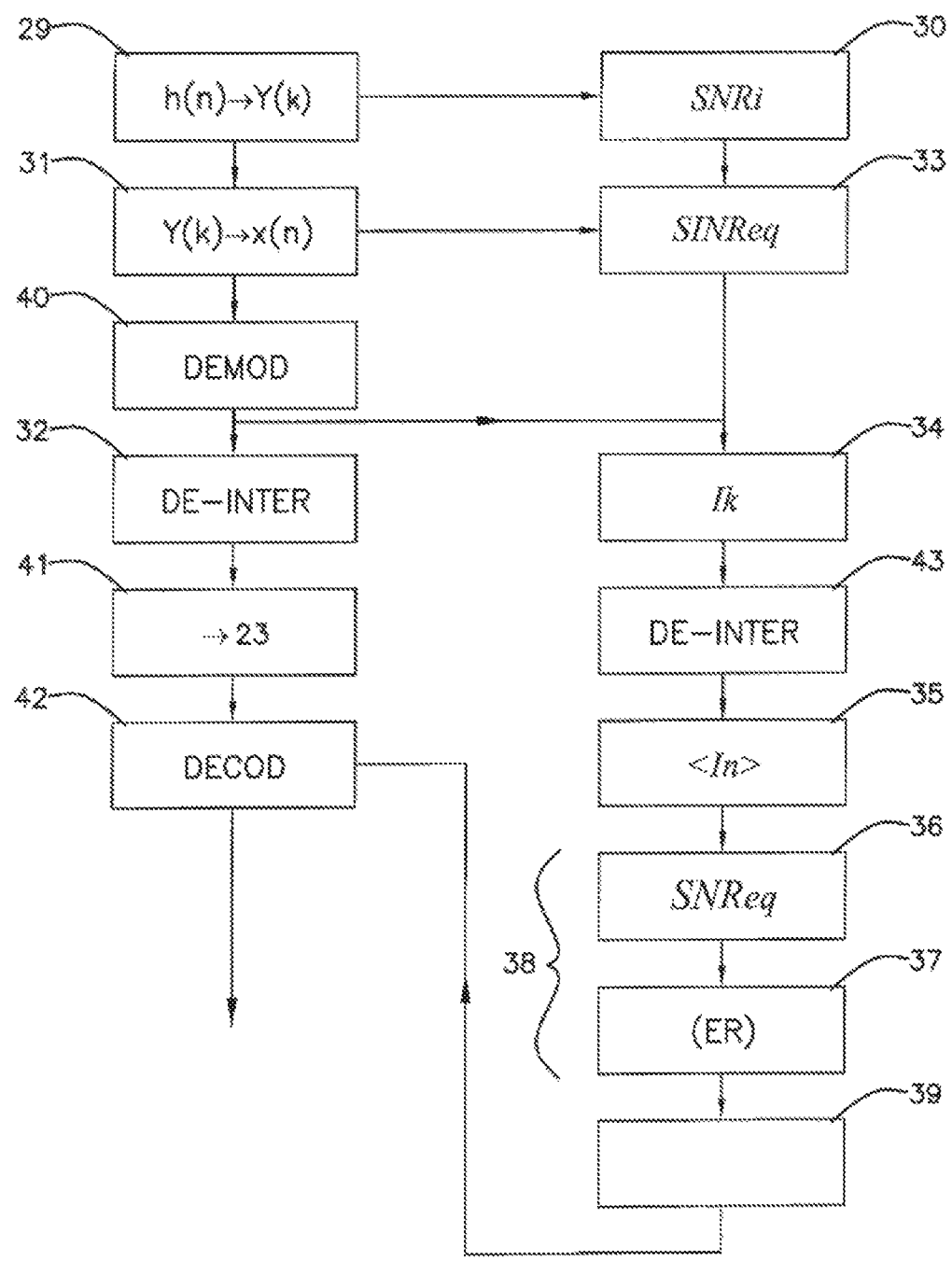
Figure 5:
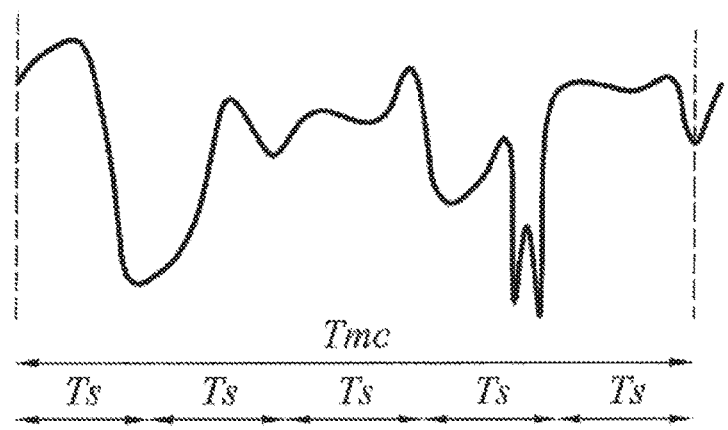
Figure 6:
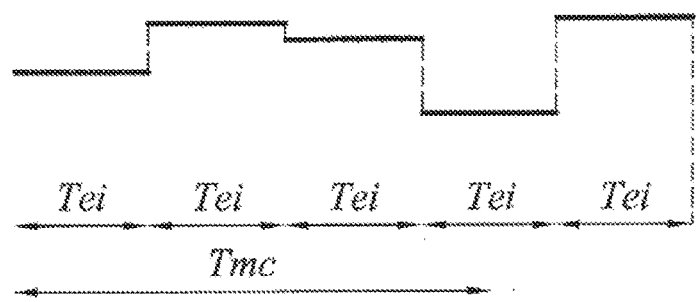
Figure 7:
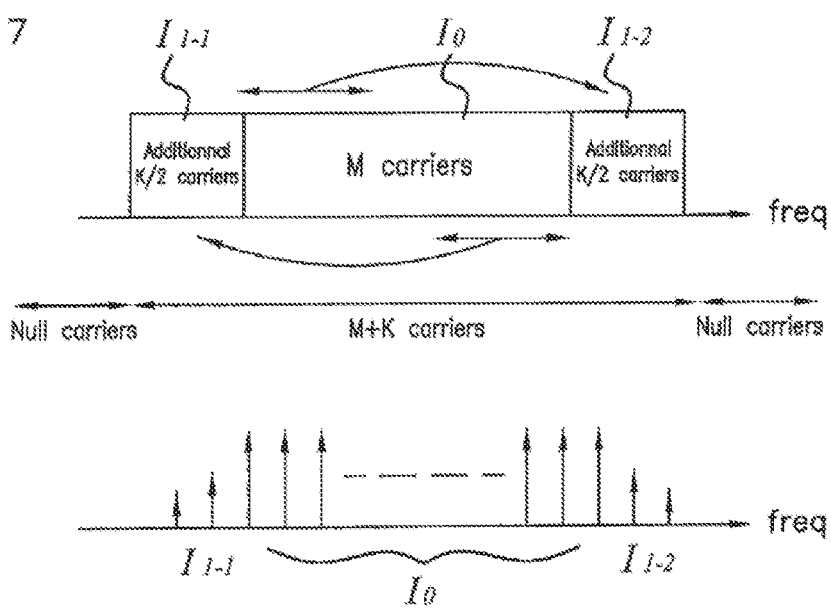
Figure 8:
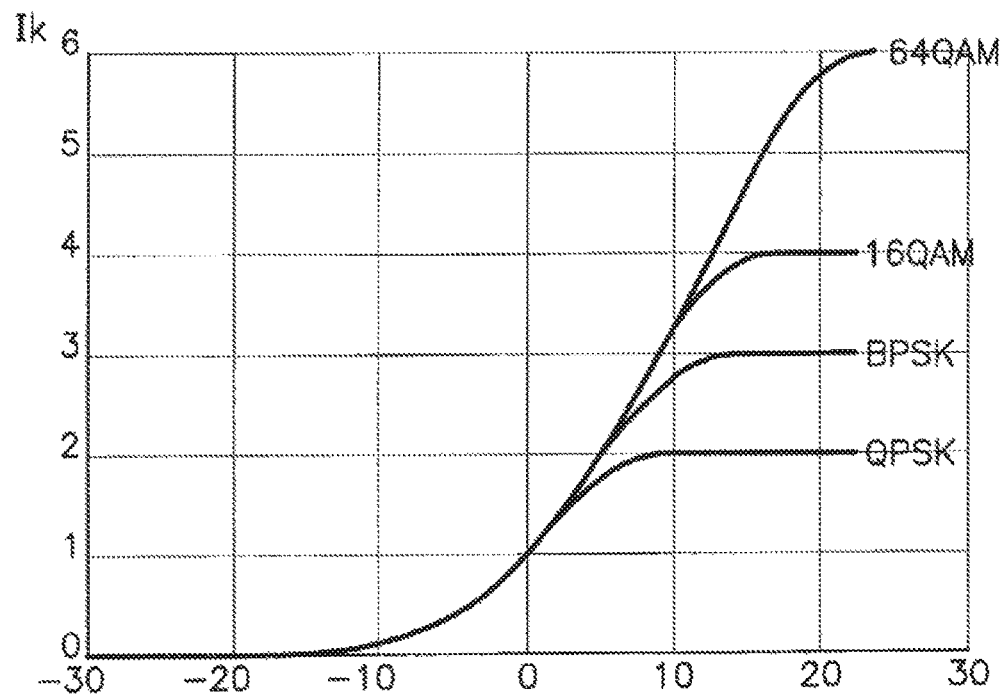
Figure 9:
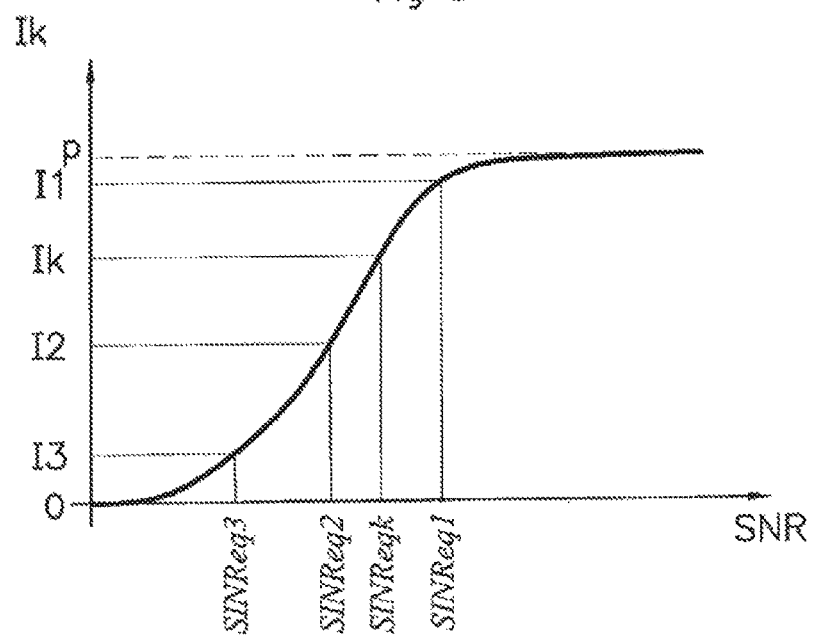
Figure 10:
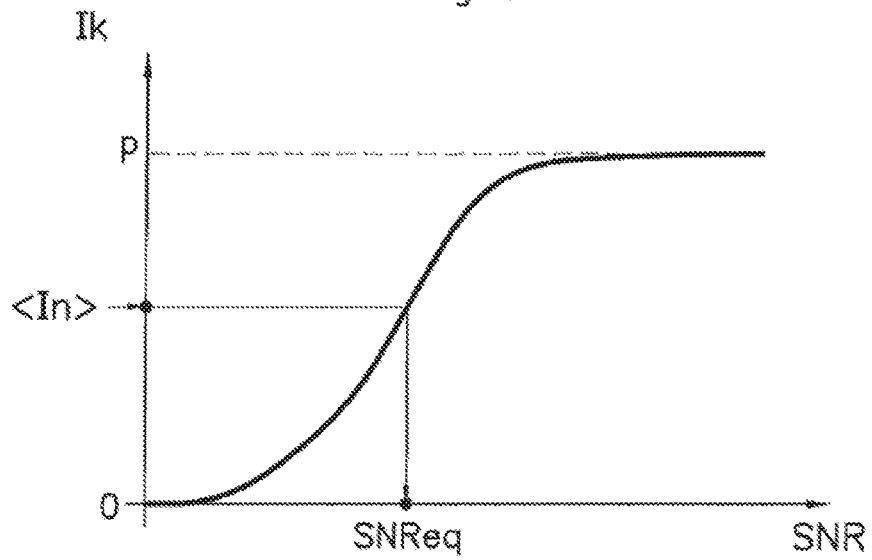
Figure 11:
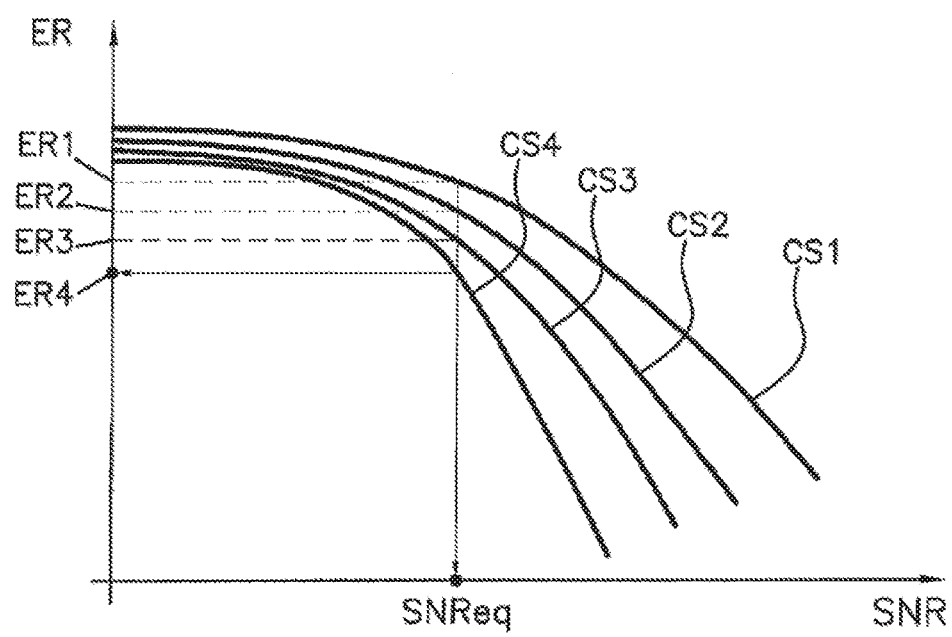
Figure 12:
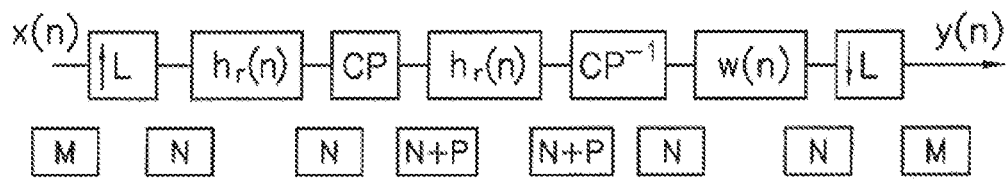
Figure 13:
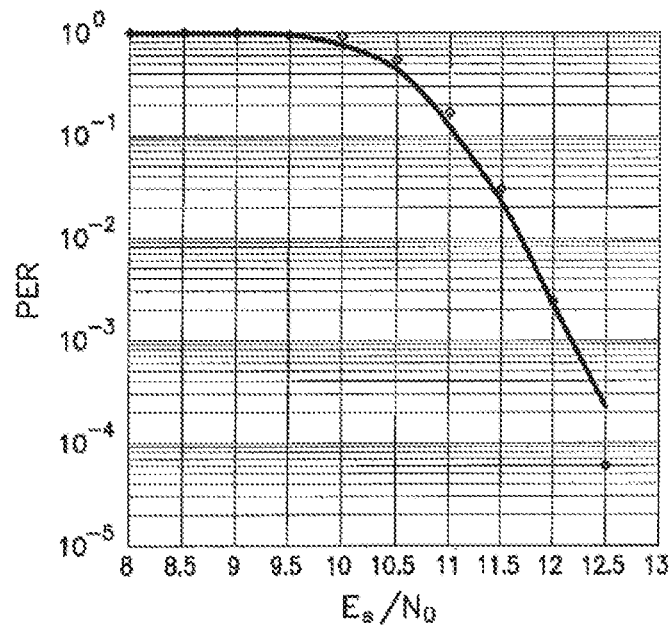
Figure 14:
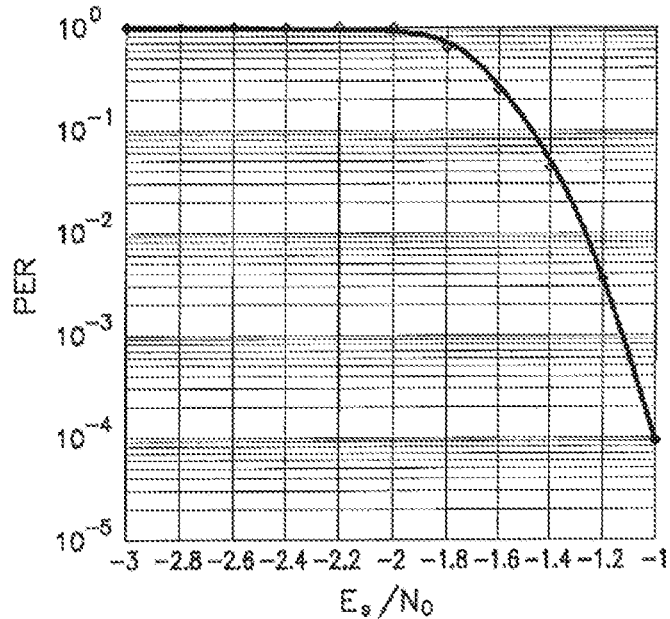

Other aims, characteristics, and advantages of the invention will become apparent on reading the following description which refers to the appended figures representing, by way of nonlimiting examples, embodiments of the invention and in which:

FIG. 1 is a functional diagram representing a transmission device according to the invention incorporating a receiver according to the invention, FIG. 2 is a functional diagram representing a sending device of a transmission device according to the invention, FIG. 3 is a functional diagram representing a receiving device and a device for predicting performance of a receiver according to the invention, FIG. 4 is a schematic flowchart representing an embodiment of a method of reception according to the invention, FIG. 5 is a diagram illustrating an example of trend of received temporal symbols and of the duration of the coded words and of the temporal symbols received in a single-carrier cyclic waveform, FIG. 6 is a diagram illustrating an example of values of the equivalent signal/noise plus interference ratio calculated on the received temporal symbols of FIG. 5, FIG. 7 is a diagram illustrating the operations carried out in the frequency domain with an EW-SC-OFDM waveform, FIG. 8 is a schematic chart of examples of reference curves that may serve, according to various modulation schemes, a predetermined function for the determination of a mutual information value on a channel with additive Gaussian white noise as a function of the signal-to-noise ratio of this channel, FIG. 9 is a schematic chart representing the use of a reference curve similar to FIG. 8 for the execution of a step of a method according to the invention, FIG. 10 is a schematic chart representing the use of a reference curve similar to FIG. 8 for the execution of a first part of a step of a method according to the invention, FIG. 11 is a schematic chart representing the use of a curve representative of a standard function for the execution of a second part of a step of a method according to the invention, FIG. 12 is a diagram illustrating the send and receive chain for a single-carrier cyclic waveform in the temporal domain (of TDM type), FIG. 13 is a chart illustrating an example of PER that may be obtained by a method according to the invention compared with an estimated value in the case of a non-frequency-selective channel, FIG. 14 is a chart illustrating an example of PER that may be obtained by a method according to the invention compared with an estimated value in the case of a frequency-selective channel.

FIG. 1 represents in a general manner a device for coded and modulated serial digital transmission on a noisy channel with non-stationary attenuation with an EW-SC-OFDM waveform. This device comprises a sender 11, a receiver 12 and a wireless physical link 13 forming the transmission channel. The physical link 13 may be for example a radio frequency link, such as those for example linking mobile terminals such as cellular telephones, personal digital assistants, laptop computers, wireless cards, terrestrial vehicles, ships, aircraft, satellites, space probes or other space systems, etc. to a base station, itself fixed (terrestrial) or mobile (vehicle, satellite, etc.) accessing a data transmission network such as the Internet network or any other private network. In general, the transmission may be bidirectional, that is to say that each mobile terminal is sometimes sending and sometimes receiving.

The sender 11 comprises a first module 14 delivering data in the form of a stream of bits (baseband signal) to be transmitted, termed the sent stream of bits. This sent stream of bits is provided to a coding module 15 which executes a predetermined coding method so as to form, on the basis of the bits, a stream of coded words, termed the sent stream of coded words. Such a coding method makes it possible in particular to increase the reliability of the transmitted data by increasing the redundancies while ensuring the correction of errors, that is to say the restitution of the initial data despite the disturbances that the transmission channel 13 may undergo.

The invention applies to any coding method, independently of the exact nature of the coding method used. It may in particular entail a coding method chosen from among the methods of the so-called LDPC type (sparse parity matrix code), methods of the turbocode type and other coding methods with iterative decoding. In most modern coding methods which make it possible to obtain performance close to the Shannon limit, the coding module 15 comprises a plurality of coders—two coders in particular.

Thus, the coding module 15 delivers coded words, which are thereafter interleaved by an interleaver circuit 17, and then modulated, according to a predetermined modulation scheme, by a modulator circuit 18 which provides a stream of modulated and interleaved information elements to a sending device 19 able to send by radiofrequency on the physical link 13 signals in the form of temporal symbols of N information elements.

The receiver 12 comprises a receiving device 20 able to receive the signals transmitted via the physical link 13 by radiofrequency, and to deliver a stream of temporal symbols of modulated and interleaved information elements received to one able to apply a demodulation according to the scheme and the modulation mapping which are used when sending, and then to a deinterleaver circuit 22 which performs the processing inverse to that of the interleaver 17 of the sender 11, that is to say allows the progressive reconstitution of a stream of temporal symbols of demodulated deinterleaved information elements, on the basis of the stream of temporal symbols of information elements arising from the demodulator circuit 21. The deinterleaver circuit 22 therefore provides a stream of coded words, termed the received stream of coded words, on the basis of the stream of demodulated deinterleaved information elements. These coded words received are thereafter provided to a buffer memory 23 and then processed progressively by a decoding module 25, comprising one or more decoder(s)—two decoders in particular —, and making it possible to deliver a stream 27 of received bits included in the signal conveyed by the physical link 13 and corresponding to the stream of bits sent by the generator circuit 14.

The receiver 12 also comprises a performance prediction module 28 described hereinafter in greater detail.

FIG. 2 represents in greater detail the sending device 19 in the case of an EW-SC-OFDM waveform with M sub-carriers (M being an integer number greater than 1, and in general of the order of several hundred, for example equal to 426). This waveform is known per se and described for example by the publication "MMSE Frequency-domain Equalization Using Spectrum Combining for Nyquist Filtered Broadband Single-Carrier Transmission" [S. OKUYAMA], 2010.

This sending device 19 comprises firstly a module 51 placing the modulated and interleaved information elements in parallel and applying a fast Fourier transform to them, so as to deliver blocks with M frequency components on the various sub-carriers. The sending device 19 also comprises an extension module 52 receiving the blocks delivered by the module 51 so as to apply an extension of K sub-carriers to them, namely K/2 sub-carriers in the bands $I_{1-1}$ and, respectively, $I_{1-2}$ (FIG. 7) at each end of the central frequency band $I_0$ of the sub-carriers, K being a non-zero integer number less than M, for example of the order of 10% of M, for example equal to 42.

The sending device 19 also comprises a module 53 for inserting pilots in a deterministic manner which may or may not be intermingled with the information-carrying sub-carriers, also adding sub-carriers of zero value at the two ends of the spectrum, so as to deliver blocks with N frequency components, N being a non-zero integer number greater than M+K, for example of the order of 512.

The sending device 19 also comprises a module 54 for weighting the K extension sub-carriers by applying a half-Nyquist filter in the frequency domain, whose transfer function is for example:

$$H_T(k) = \begin{cases} 1, & 0 \le |k| < \frac{1-\alpha}{2}M \\ \cos\left[\frac{\pi}{2\alpha M}\left\{|k| - \frac{1-\alpha}{2}M\right\}\right], & \frac{1-\alpha}{2}M \le |k| < \frac{1+\alpha}{2}M \\ 0, & \text{in other cases} \end{cases}$$

α being the roll-off factor (or roll-off coefficient) of the Nyquist filter, and M being the number of information-carrying sub-carriers.

The blocks with N frequency components delivered by the weighting module 54 are submitted to a module 55 which applies an inverse fast Fourier transform to them followed by a parallel/series transformation so as to deliver temporal symbols of N information elements. These temporal series symbols are processed by a module 56 inserting guard intervals (cyclic prefixes corresponding to a copied part of the symbols) between the symbols, and the signal obtained is sent on the transmission line 13 by a sending circuit 57 comprising a digital-analog converter and a radiofrequency sender linked to a sending antenna.

The receiving device 20 comprises a reception circuit 61 comprising an analog-digital converter and a radiofrequency receiver linked to a reception antenna, making it possible to receive signals sent by a sending device 19 and comprising temporal symbols h(n) of N modulated and interleaved information elements. The temporal symbols received are processed by a module 62 deleting the guard intervals between the symbols, and providing temporal symbols as input to a module 63 placing the modulated and interleaved information elements in parallel and applying a fast Fourier transform to them so as to deliver blocks Y(K) received with N frequency components (step 29, FIG. 4).

These received blocks Y(K) are provided to the input of an equalization module 64 applying a predetermined method of equalization W(K) in the frequency domain, and to the input of a module 65 for deweighting the K extension sub-carriers. The equalized and deweighted blocks obtained are thereafter provided to the input of a module 66 deleting the extension and therefore delivering blocks with M frequency components to the input of a module 67 which deletes the pilots of the stream of information symbols.

The received blocks Ye(K) thus obtained with M frequency components are delivered to the input of a module 68 applying an inverse fast Fourier transform to them followed by a parallel/series transformation so as to deliver modulated and interleaved information elements x(n) to the input of the demodulator 21, which provides demodulated and interleaved information elements to the input of the deinterleaver 22, the latter providing demodulated and deinterleaved information elements.

The left part of FIG. 4 illustrates the various steps carried out by the receiver 12. Step 31 of FIG. 4 represents the set of operations carried out by the equalization module 64, the deweighting module 65, the module 66 deleting the extension, the module 67 for deleting the pilots, and the module 68 applying an inverse fast Fourier transform so as to deliver information elements x(n) on the basis of the received blocks Y(K) with M frequency components. During the subsequent step 40, the received stream of coded words is demodulated by the demodulator 21. It is thereafter deinterleaved by the deinterleaver 22 during the subsequent step 32, and then stored in the buffer memory 23 during step 41.

The performance prediction module 28 carries out the steps illustrated in the right part of FIG. 4. FIG. 4 thus represents a flowchart of an exemplary method of reception according to the invention implemented in a receiver 12 according to the invention.

The performance prediction module 28 receives the blocks Y(K) received with N frequency components at the output of the module 63 applying a fast Fourier transform on reception. On the basis of these blocks Y(K), this module determines during step 30 a signal/noise ratio γ=SNRi for each frequency component of a received block, and for the various temporal symbols of information elements received of the received signal corresponding to one and the same information element. This calculation is carried out on all the sub-carriers used for the fast Fourier transform (module 51) when sending (EW)-SC-OFDM.

On the basis of these stored values of the signal/noise ratios SNRi of each useful frequency component of a received block, the performance prediction module 28 calculates during step 33, for each information element, as a function of the equalization method, and according to the interference due to the waveform, an equivalent signal/noise plus interference ratio SINReq as a function of the equalization method.

In the example represented in the figures of an EW-SC-OFDM waveform, said value SINReq of the equivalent signal/noise plus interference ratio is calculated according to the formula (III).

For example, in the case of an equalization method of minimized mean square error (MMSE) based or Wiener filter based type, the transfer function of the equalization filter is given by:

$$\tilde{W}[k] = \begin{cases} \dfrac{\gamma |\tilde{H}[k]|^2}{\gamma |\tilde{H}[k]|^2 + 1} & , \forall k \in I_0 \\ \dfrac{\gamma(|\tilde{H}_1[k]|^2 + |\tilde{H}_2[k]|^2)}{\gamma(|\tilde{H}_1[k]|^2 + |\tilde{H}_2[k]|^2) + 1} & , \forall k \in I_1 \end{cases}$$

$$W_0[k] = \dfrac{\gamma \tilde{H}[k]^2}{\gamma |\tilde{H}[k]|^2 + 1}, \forall k \in I_0$$

$$W_1[k] = \dfrac{\gamma \tilde{H}_\gamma[k]^2}{\gamma((|\tilde{H}_1[k]|^2 + |\tilde{H}_2[k]|^2) + 1)}, \forall k \in I_1$$

With $\tilde{H}(k) = H[k]F[k]$, the gain of the global channel which takes into account the gain $H[k]$ of the channel (discrete Fourier transform of order N of the discrete impulse response) and the weighting window $F[k]$ applied when sending.

The value SINReq of the equivalent signal/noise plus interference ratio is therefore given by the formula (IV).

FIG. 5 represents an example of temporal symbols received of duration Ts corresponding to a coded word of duration Tmc with such a waveform. FIG. 6 represents an example of equivalent signal/noise plus interference ratio values SINReq that may be obtained with the formula hereinabove. As is seen, these values are established whilst the duration Tmc of a coded word does not correspond to a multiple of the duration Tei of the information elements received for this coded word.

In the case of an SC-OFDM waveform without weighting, said value SINReq of the equivalent signal/noise plus interference ratio is given by formula (I).

For example, in the case of an equalization method of minimized mean square error (MMSE) based or Wiener filter based type, the transfer function of the equalization filter is given by:

$$W[k] = \dfrac{\gamma H[k]^2}{\gamma |H[k]|^2 + 1}$$

The value SINReq of the equivalent signal/noise plus interference ratio is therefore given by the formula (II).

In the case of an equalization method of zero forcing (ZF) type, the transfer function of the equalization filter is given by the following formula (IX):

$$SINR_{eq} = \dfrac{1}{\beta} \qquad (IX)$$

$$\beta = \dfrac{1}{M} \sum_{k=0}^{M-1} \dfrac{1}{\gamma_k}$$

$$\gamma_k = |H[k]|^2 \gamma$$

In the case of a temporal waveform of TDM type, the send and receive chain, including the transmission channel, is represented in FIG. 12. In this figure:

M and N represent natural integers, the meaning of which is similar to those mentioned hereinabove for an EW-SC-OFDM waveform (grouping of complex symbols)

L corresponds to the interpolation factor=N/M,

CP corresponds to the addition of the cyclic prefix (cyclic copy of part of the N samples), $h_T(n)$ is a temporal-like Nyquist filter, $h_C(n)$ is a filter representing the propagation channel, $W(n)$ is a temporal equalization filter.

It may be demonstrated that the expression for the equivalent signal/noise plus interference ratio SINReq is the same as in respect of the frequency domain (formula (III) hereinabove) on taking:

$h(n) = h_T(n) \otimes h_c(n)$ with $\otimes$ circular convolution operator, $\tilde{H}[k]$ is the discrete Fourier transform of $\{h(n)\}$, $W[k]$ is the discrete Fourier transform of $\{w(n)\}$.

The performance prediction module 28 makes it possible to determine an error rate, before the decoding (and therefore without requiring the latter to be carried out), for each information element received, taking into account the variations of attenuation of the channel on the information elements received, that is to say on the various parts of the corresponding received coded words. The method implemented to do this can be identical to that described by FR 2 952 254.

During step 33, the various values SINReq representing the transmission quality are calculated by the performance prediction module 28 on the basis of the received stream of coded words, doing so for each information element of a corresponding coded word received stored in the memory 23 of the received stream of coded words.

On the basis of these various values SINReq, a mutual information value $I_k$ is formulated by the performance prediction module 28, during the subsequent step 34, according to a predetermined function.

Two variants of the invention are possible as regards the choice of the predetermined function for the calculation of said mutual information value $I_k$.

If an information element received $y_k$ is considered, this information element corresponds to the information element sent $x_k$ attenuated by $c_k$ and made noisy by additive Gaussian white noise. Because of the chosen modulation with cardinal $M=2^P$, this information element received $y_k$ contains the information relating to p bits sent $b^k_1 \, b^k_2 \ldots b^k_p$.

A first variant embodiment of the invention consists in considering the mutual information $I((b^k_1, b^k_2, b^k_p), y_k)$ equal to the mutual information $I_k$ between the information element sent $x_k$ and the information element received $y_k$. This variant has the advantage of proposing a unique theoretical formula for calculating a reference curve of the mutual information which depends only on the nature of the modulation considered. This approach does not take account of the real implementation ("mapping") of the modulation, nor of the fact that the p constituent bits of the information element $x_k$ are not all protected in the same way against the noise of the channel.

In this first variant, each mutual information value $I_k$ is determined according to the function defined by the above-mentioned formula (I).

The expression for $f(u,v)$ is in analytic form and can therefore be evaluated for all values of u and v. For the integral, it suffices to discretize this integral by any numerical procedure. For example, by using a rectangles procedure, each mutual information value $I_k$ is obtained according to the function defined by the formula (VI).

As is seen, for a given modulation, a known channel attenuation and noise spectral density, the mutual information between the information elements sent and received depends only on the value of the equivalent signal/noise plus interference ratio SINReq.

A reference curve for each modulation scheme can therefore be obtained by numerical evaluation of the above expression. The reference curves represented in FIG. 3 are for example obtained, respectively for the following modulation schemes: QPSK, BPSK, 16QAM, 64QAM.

A second variant consists in taking account of the real implementation ("mapping") of the modulation and in considering each bit. For each of the p constituent bits $b^k_1$ $b^k_2 \ldots b^k_p$ of the information element sent $x_k$, the mutual information $I_k(b^k_1,y_k)$, $I_k(b^k_2,y_k) \ldots I_k(b^k_p,y_k)$ between each bit and the information element received $y_k$ is calculated.

The reference curve used to obtain the mutual information is then the sum of these p curves.

Thus, in this second variant, each mutual information value $I_k$ is determined according to the function $I_k(b^j_k,y_k)$ of the mutual information calculated between the jth bit ($0 \leq j \leq p-1$) of the information element sent $x_k$ and the information element received $y_k$, this function being defined by the above-mentioned formula (VII).

This general formula (VII) is valid in the case where geometrically these two sets of normalized information elements have the same geometric distribution in the complex plane, that is to say when these two sets are equal to within a rotation or translation of the plane. In the converse case, an analytic formula can also be written but it is more complex. The above-mentioned assumption encompasses the PSK modulations by geometric distribution termed "mapping Gray".

The expressions for f(u,v) and g(u,v) are in analytic form and can therefore be evaluated for all values of u and v. For the integral, it suffices to discretize this integral by any numerical procedure. For example, by using a rectangles procedure, each mutual information value $I_k$ is obtained according to the function $I_k(b^j_k,y_k)$ of the mutual information calculated between the jth bit ($0 \leq j \leq p-1$) of the information element $x_k$ sent and the information element received $y_k$, this function $I_k(b^j_k,y_k)$ being defined by the formula (VIII), with, if it is desired to evaluate the various Gaussians of f(u,v) and $g_j(u,v)$ up to at least their probability a over a number of points β in the mesh, the following values of threshold and of (Δu, Δv):

$$\text{thresh} = \sqrt{-\text{SINR}_{eq} \ln\left(\alpha \sqrt{\text{SINR}_{eq}\pi}\right)} +$$
$$\text{Max}_{0 \leq k \leq M-1}(\text{real}(\text{SINR}_{eq} S'_k), \text{imag}(\text{SINR}_{eq} S'_k))$$
$$\text{and } \Delta u = \Delta v = 2\frac{\text{thresh}}{\beta}$$

$I_k(b^j_k,y_k)$ lies between 0 and 1. The reference curve to be used on each information element is the sum of the curves for each of the p bits.

Whatever variant is used, a reference curve representing a predetermined function providing a mutual information value $I_k$ is therefore obtained as a function of a signal/noise ratio SNR.

It should be noted that each reference curve to which reference is made throughout the text is in practice realized by a table of numerical values recorded in mass memory. The performance prediction module 28 uses such a table to determine the appropriate numerical values allowing the use of such a curve.

During step 34 of calculating the mutual information $I_k$ such as represented in FIG. 4, the performance prediction module 28 considers the reference curve mentioned hereinabove, that is to say the table of recorded numerical values, and each value of the equivalent signal/noise plus interference ratio SINReq as value of the signal/noise ratio to be plotted as abscissa in order to determine each value of $I_k$.

During the subsequent step 43 these various values $I_k$ are submitted to the deinterleaving method, and then during the subsequent step 35, for each coded word of the received stream of coded words, an average $<I_n>$ of mutual information is formulated by averaging the various mutual information values $I_k$ determined for the various values taken by the equivalent signal/noise plus interference ratio SINReq on said coded word.

During the subsequent step 36, the performance prediction module 28 reuses the same reference curve (that is to say the same table of numerical values) to determine a value of equivalent signal/noise ratio $\text{SNR}_{eq}$ on the coded word received on the basis of said mutual information average $<I_n>$. Stated otherwise, the performance prediction module 28 uses the inverse function $I_k^{-1}$.

During the subsequent step 37, the performance prediction module 28 calculates each value of the error rate ER on the basis of said value of equivalent signal/noise ratio $\text{SNR}_{eq}$ and of stored data representative of variations of an equivalent error rate according to a standard function predetermined for the coding and decoding modules used on a channel with additive Gaussian white noise.

Indeed, for a predetermined coding module 15 and a predetermined decoding module 25, there exists a standard function, obtained in a manner known per se by simulation on the stationary Gaussian channel, expressing the error rate per coded word PER or the error rate per bit BER as a function of the signal/noise ratio. FIG. 6 represents an example of curves representative of standard functions such as these, the various curves being obtained for the same decoding and coding modules and varying from one another as a function of the number of iterations used for the decoding.

For each value of the equivalent signal/noise ratio $\text{SNR}_{eq}$, the performance prediction module 28 calculates, on the basis of these curves, that is to say of the tables of corresponding recorded numerical values, a set of error rates $\text{ER}_i$, that is to say a value of error rate for each number of iterations that may be used on decoding. The error rate values $\text{ER}_i$ decrease with the number of iterations. This set of values $\text{ER}_i$ therefore constitutes an error rate (ER) vector, determined for each coded word received.

In the example of FIG. 6, four standard function curves have been represented: a first curve CS1 corresponding for example to a single iteration, a second curve CS2 corresponding for example to four iterations, a third curve CS3 corresponding for example to eight iterations, and a fourth curve CS4 corresponding for example to sixteen iterations. An error rate vector having four components (ER)=(ER1, ER2, ER3, ER4) is thus obtained on the basis of the value of the equivalent signal/noise ratio $\text{SNR}_{eq}$.

It should be noted that the two steps 36, 37 can be amalgamated into a single step 38 if the standard functions are combined with the inverse function $I_k^{-1}$ into a single function providing directly, for each number of iterations, curves of variation of the error rate ER as a function of the mutual information average $<I_n>$.

The received stream of deinterleaved coded words which is stored in the buffer memory 23 is decoded during step 42 by the decoding module 25 on the basis in particular of a control signal formulated during step 39 on the basis of each error rate value calculated by the performance prediction module 28.

In a first variant in which the decoding method has a fixed number of iterations that cannot be modified by control, the control module of the performance prediction module 28 formulates a control signal chosen from among a decoding authorization signal and a decoding prohibition signal. In this case, the performance prediction module 28 calculates a single value of error rate ER (PER or BER). In practice, a decoding authorization signal will be formulated when the calculated value of the error rate is less than a predetermined and recorded error rate setting, and a decoding prohibition signal will be formulated when the calculated value of the error rate is greater than this value of error rate setting. This variant is particularly beneficial especially when the coded block is received over several disjoint time spans that may spread over a very long duration (several seconds in the case of the DVB-SH time disperser). It makes it possible to trigger a single decoding per coded word without attempting the decoding on reception of each new piece of the coded word.

According to a second variant, the performance prediction module 28 moreover advantageously incorporates a control module making it possible to formulate, during step 39, a control signal for the decoding module 25 in such a way that the latter implements, for each coded word received to be decoded, a number of iterations calculated as a function of the error rates $ER_i$. For example, the control module determines in the set of error rates $ER_i$ the value $ER_{opt}$ of the error rate which is the largest and is less than a predetermined and recorded error rate setting, and controls the decoding module 25 as a function of the number of iterations corresponding to this value $ER_{opt}$.

FIGS. 13 and 14 are examples implemented with an SC-OFDM waveform with a QPSK modulation, M=512, N=1024, which show that the values of PER that can be obtained as a function of the signal/noise ratio $SNRi=Es/N_0$ according to the invention (dots in the figures) correspond to values estimated by simulation (curve in the figures), this being so both for a frequency-selective channel and for a Gaussian channel.

Up until now, such a result was considered to be impossible to obtain with single-carrier cyclic waveforms. In particular, it makes it possible to know in advance with excellent reliability the characteristics of the transmission, without requiring complete simulation of the physical link itself, and can be used to optimize the design and the manufacture of the receiver as a function of the transmission quality constraints imposed (probability along the ordinate in the figure) by choosing the maximum signal/noise ratio making it possible to comply with these constraints. Thus, in particular, the invention makes it possible to avoid any overdimensioning.

The invention makes it possible to improve by a factor of the order of 500 the average duration required for the evaluation with respect to a complete simulator generating the coded packets. An empirical rule indeed indicates that with a complete simulator such as this, to know the PERs (packet error rates), it is necessary to generate coded packets until 100 packets are false. Thus, for example, for a PER of 0.01, the number of packets to be generated in order to obtain a single value of PER over time, it will be necessary to generate 10 000 coded words.

Moreover, tests show that the evaluation according to the invention is on average faster than real time. Stated otherwise, the performance in terms of PER on a channel of duration D will be obtained in a calculation time which is slightly less than the duration D.

The main configuration parameters for the simulator are: the type (rows-columns; convolutional, etc.) and the parameters of the deinterleaver making it possible to change the parameters such as defined in the DVB-NGH standard (interleaving depth, interleaving unit (number of symbols), etc.); the parameters of the channel which allow the user to choose a channel model and to modify the parameters associated with this model; the parameters of the physical link which allow the user to modify the parameters of the waveform (guard intervals, band, number of sub-carriers) as well as the coding rate.

The invention can form the subject of numerous variant embodiments and applications other than those mentioned hereinabove.

The invention claimed is:

1. A method performed by a receiving device for receiving and processing digital data transmitted on a coded and modulated serial digital transmission on a noisy channel with non-stationary attenuation, comprising:
   receiving a signal by the receiving device, said received signal incorporating a stream of temporal symbols of information elements corresponding to a stream of temporal symbols of information elements sent on said noisy channel and representative of information elements corresponding to the digital data to be transmitted, each information element being represented by a plurality of said temporal symbols, the received signal with a waveform chosen from a group of cyclic waveforms comprising guard intervals repeated in a cyclic manner, and single-carrier waveforms with fluctuations corresponding to a single carrier,
   applying a predetermined equalization by said receiving device to the temporal symbols of information elements received,
   generating at least one stream of coded words by a demodulation based on the received stream of temporal symbols of information elements,
   generating a received stream of bits by decoding each received stream of coded words, according to a decoding corresponding to a coding implemented based upon coded and modulated serial digital transmission of the noisy channel, wherein the method further comprising:
   storing digital data associating a value of transmission quality with the information elements received,
   in a first step, formulating a mutual information value $I_k$ for each value of said transmission quality according to a predetermined function of said transmission quality,
   wherein said value of transmission quality consists of an equivalent signal to noise plus interference ratio calculated as a function of said equalization on the basis of values of signal to noise ratio of the noisy channel which are measured for the temporal symbols of information elements received of the received signal corresponding to one and the same information element and according to interference due to said waveform; and
   providing said value of transmission quality as a performance prediction of the transmission on the noisy channel.

2. The method as claimed in claim 1, wherein said waveform is chosen from the group of single-carrier waveforms with frequency division on a plurality of M sub-carriers, the received signal with temporal symbols of N modulated information elements, N being an integer number greater than M, said temporal symbols being separated from one another by guard intervals, the receiving device being adapted for:
- deleting the guard intervals,
- applying a fast Fourier transform of order N to the temporal symbols of the signal received, and producing receiving blocks of frequency components on said sub-carriers,
- applying said equalization to said received blocks so as to produce equalized blocks,
- applying an inverse fast Fourier transform to the equalized blocks so as to produce a stream of equalized temporal symbols,
- digital data are stored allowing to determine a value of a signal to noise ratio SNRi for each frequency component of said received block,
- said transmission quality consists of one and a same value SINReq of an equivalent signal to noise plus interference ratio calculated as a function of said equalization based on said values of the signal to noise ratios SNRi for all the frequency components of one and a same received block.

3. The method as claimed in claim 2, wherein the received signal with single-carrier orthogonal frequency division multiple access (SC-OFDM) waveform without weighting, said value SINReq of the equivalent signal to noise plus interference ratio is calculated according to (I):

$$\text{SINReq} = \frac{|\alpha|^2}{\frac{1}{M}\sum_{k=0}^{M-1}(|H[k]|^2 + \gamma^{-1})|W[k]|^2 - |\alpha|^2} \quad \text{(I)}$$

$$\text{with } \alpha = \frac{1}{M}\sum_{k=0}^{M-1} W[k]H[k]$$

wherein:
- H[k] is a gain of the channel calculated by discrete Fourier transformation of a discrete impulse response,
- W[k] is a transfer function of the equalization and weighting, and $\tilde{W}[k] = W[k] H[k]$,
- Y is a mean signal-to-noise ratio (in time/frequency).

4. The method as claimed in claim 3, wherein said equalization is based on a minimized mean square error (MMSE) or on a Wiener filter, said value SINReq of the equivalent signal to noise plus interference ratio is calculated according to (II):

$$\text{SINReq} = \frac{\beta}{1-\beta} \quad \text{(II)}$$

$$\beta = \frac{1}{M}\sum_{k=0}^{M-1} \frac{\gamma_k}{\gamma_k + 1}$$

$$\gamma_k = |H[k]|^2 \gamma.$$

5. The method as claimed in claim 2, wherein the received signal with an extended weighted single-carrier orthogonal frequency division multiplexing (EW-SC-OFDM) waveform comprising an extension of frequencies with weighting, said value SINReq of the equivalent signal to noise plus interference ratio is calculated according to (III):

$$\text{SINReq} = \frac{|\alpha|^2}{\frac{1}{M}\sum_{k=0}^{M-1}(|\tilde{W}[k]|^2 + \gamma^{-1}|W[k]|^2) - |\alpha|^2} \quad \text{(III)}$$

$$\text{with } \alpha = \frac{1}{M}\sum_{k=0}^{M-1} \tilde{W}[k]$$

$$|W[k]|^2 = \begin{cases} |W_0[k]|^2 & , \forall k \in I_0 \\ |W_1[k]|^2 + |W_2[k]|^2 & , \forall k \in I_1 \end{cases}$$

wherein:
- $I_0$ is a central band of the unweighted frequencies (non-recombination of the sub-carriers), $I_1$ is formed of end bands $I_{1-1}$ and $I_{1-2}$ of weighted frequencies (where the sub-carriers are recombined), the low band $I_{1-1}$ being referenced by an index 1, the high band $I_{1-2}$ by an index 2,
- H[k] is a gain of the channel calculated by discrete Fourier transformation of a discrete impulse response,
- W[k] is a transfer function of the equalization and weighting, and $\tilde{W}[k] = W[k] H[k]$,
- $W_0[k]$: is a transfer function of the equalization and weighting in the central frequency band $I_0$ corresponding to the neutral weighting (no recombination of the sub-carriers),
- $W_1[k]$ and $W_2[k]$ are transfer functions of the equalization and weighting respectively in the two frequency bands $I_{1-1}$ and $I_{1-2}$ where the sub-carriers are recombined and weighted,
- Y is a mean signal-to-noise ratio:

$$\gamma = \frac{\sigma_X^2}{\sigma_B^2}$$

$$\text{with } \sigma_X^2 = \mathbb{E}(|X[k]|^2) = M\sigma_x^2.$$

6. The method as claimed in claim 5, wherein said equalization being based on a minimized mean square error (MMSE) or a Wiener filter, said value SINReq of the equivalent signal to noise plus interference ratio is calculated according to (IV):

$$\text{SINReq} = \frac{\alpha}{1-\alpha}. \quad \text{(IV)}$$

7. The method as claimed in claim 2, wherein values of the signal to noise ratios SNRi for each sub-carrier are values measured in tandem with the received temporal symbols of the received signal.

8. The method as claimed in claim 1, wherein each mutual information value $I_k$ is formulated according to the function defined by (V):

$$I_k(x_k, y_k) = \quad \text{(V)}$$
$$-\log_2(\pi e \text{SINR}_{eq}) - \int_{u=-\infty}^{\infty}\int_{v=-\infty}^{\infty} f(u,v)\log_2(f(u,v))du\,dv$$

$$f(u,v) = \frac{1}{M\pi(\text{SINR}_{eq})}\sum_{m=0}^{M-1} \exp\left(\frac{-(v - \text{SINR}_{eq} \times \text{imag}(S'_m))^2}{\text{SINR}_{eq}}\right)$$

$$\exp\left(\frac{-(u - \text{SINR}_{eq} \times \text{real}(S'_m))^2}{\text{SINR}_{eq}}\right)$$

$$S'_m = \frac{1}{\sqrt{E_S}} S_m$$

wherein $X_k$ representing a respective symbol transmitted and $Y_k$ representing a respective symbol received, Es representing an average energy per a respective modulated information element being transmitted, and M being a cardinal of the alphabet $A=\{S_0, S_1, \ldots, S_{M-1}\}$ of the modulated symbols.

9. The method as claimed in claim 1, wherein each mutual information value $I_k$ is formulated according to a function defined by (VI):

$$I_k(x_k, y_k) = -\log_2(\pi e \text{SINR}_{eq}) - \qquad \text{(VI)}$$

$$\Delta u \Delta v \sum_{q=-thresh}^{thresh} \sum_{r=-thresh}^{thresh} f(q\Delta u, r\Delta v) \log_2(f(q\Delta u, r\Delta v))$$

$$thresh = \sqrt{-\text{SINR}_{eq} \ln\left(\alpha\sqrt{\text{SINR}_{eq}\pi}\right)} +$$

$$\text{Max}_{0 \leq m \leq M-1} * (\text{real}(\text{SINR}_{eq} S'_m), \text{imag}(\text{SINR}_{eq} S'_m))$$

$$\text{and } \Delta u = \Delta v = 2\frac{thresh}{\beta}$$

$$S'_m = \frac{1}{\sqrt{E_S}} S_m$$

wherein $X_k$ representing a respective symbol transmitted and $Y_k$ representing a respective symbol received, Es representing an average energy per a respective modulated information element being transmitted, and M being a cardinal of the alphabet $A=\{S_0, S_1, \ldots, S_{M-1}\}$ of the modulated symbols.

10. The method as claimed in claim 1, wherein each mutual information value $I_k$ is formulated according to a function $I_k(b^j_k, y_k)$ of mutual information calculated between the jth bit ($0 \leq j \leq p-1$) of the information element $X_k$ sent and the information element received $y_k$, this function being defined by (VII):

$$I_k(b^j_k, y_k) = -\int_{u=-\infty}^{\infty}\int_{v=-\infty}^{\infty} f(u,v)\log_2(f(u,v))du\,dv + \qquad \text{(VII)}$$

$$\int_{u=-\infty}^{\infty}\int_{v=-\infty}^{\infty} g_j(u,v)\log_2(g_j(u,v))du\,dv$$

$$f(u,v) = \frac{1}{M\pi(\text{SINR}_{eq})} \sum_{m=0}^{M-1} \exp\left(\frac{-(v-\text{SINR}_{eq}\times \text{imag}(S'_m))^2}{\text{SINR}_{eq}}\right)$$

$$\exp\left(\frac{-(u-\text{SINR}_{eq}\times \text{real}(S'_m))^2}{\text{SINR}_{eq}}\right)$$

and $$g_j(u,v) = \frac{2}{M\pi(\text{SINR}_{eq})} \sum_{m=0}^{M/2-1} \exp\left(\frac{-(v-\text{SINR}_{eq}\times \text{imag}(B_m^{j,0}))^2}{\text{SINR}_{eq}}\right)$$

$$\exp\left(\frac{-(u-\text{SINR}_{eq}\times \text{real}(B_m^{j,0}))^2}{\text{SINR}_{eq}}\right)$$

$$S'_m = \frac{1}{\sqrt{E_S}} S_m$$

M being a cardinal of the alphabet $A=\{S_0, S_1, \ldots, S_{M-1}\}$ of the modulated symbols and Es representing an average energy per a respective modulated information element being transmitted, $\{B_m^{j,0}\}0 \leq m \leq 2^{p-1}-1$ being a set of normalized symbols $S'_m$ of p bits $0 \leq j \leq p-1$, whose bit numbered m equals 0,
$\{B_m^{j,0}\}0 \leq m \leq 2^{p-1}-1$ being a set of normalized symbols $S'_m$ of p bits $0 \leq j \leq p-1$, whose bit numbered m equals 1.

11. The method as claimed in claim 1, wherein each mutual information value $I_k$ is formulated according to a function $I_k(b^j_k, y_k)$ defined by (VIII):

$$I_k(b^j_k, y_k) = \Delta u \Delta v \left( \sum_{q=-thresh}^{thresh} \sum_{r=-thresh}^{thresh} f(q\Delta u, r\Delta v)\log_2(f(q\Delta u, r\Delta v)) + \qquad \text{(VIII)} \right.$$

$$\left. \sum_{q=-thresh}^{thresh} \sum_{r=-thresh}^{thresh} g_j(q\Delta u, r\Delta v)\log_2(g_j(q\Delta u, r\Delta v)) \right)$$

$$thresh = \sqrt{-\text{SINR}_{eq} \ln\left(\alpha\sqrt{\text{SINR}_{eq}\pi}\right)} +$$

$$\text{Max}_{0 \leq k \leq M-1}(\text{real}(\text{SINR}_{eq} S'_k), \text{imag}(\text{SINR}_{eq} S'_k))$$

$$\text{and } \Delta u = \Delta v = 2\frac{thresh}{\beta}$$

$$S'_k = \frac{1}{\sqrt{E_S}} S_k$$

Wherein $S_k$ is the kth symbol and Es representing an average energy per a respective modulated information element being transmitted.

12. The method as claimed in claim 1, wherein:
in a second step, an average $<I_n>$ of mutual information is formulated for each coded word of the received stream of coded words, by averaging values of mutual information $I_k$ formulated in the first step for the values taken by said transmission quality on said coded word,
in a third step, at least one value of an error rate ER of the received stream of bits is formulated without carrying out the decoding for each coded word of the received stream of coded words, on the basis of each value of the mutual information average $<I_n>$ formulated in the second step, and by using stored data representative of variations of an equivalent error rate according to at least one function, termed a standard function, of the signal to noise ratio, each standard function being predetermined for a coding and device and a decoding device on a channel with additive Gaussian white noise.

13. A computing device comprising computing means for numerical processing of data, adapted and programmed for implementing a method as claimed in claim 1.

14. A computer program product recorded on a non-transitory computer medium usable in a computing system, comprising computer instructions for executing a method as claimed in claim 1.

15. A receiver for receiving coded and modulated serial digital transmission on a noisy channel with non-stationary attenuation, comprising:
a receiving device adapted for receiving a received signal incorporating a stream of temporal symbols of information elements corresponding to a stream of temporal symbols of information elements sent on said noisy channel and representative of information elements corresponding to digital data to be transmitted, each information element being represented by a plurality of said temporal symbols, the received signal exhibiting a waveform chosen from a group of cyclic waveforms, comprising guard intervals repeated in a cyclic manner, and single-carrier waveforms, with fluctuations corresponding to a single carrier, an equalization device applying a predetermined equalization to the temporal symbols of information elements received, a demodulation device adapted for generating at least one received stream of coded words on the basis of the stream of temporal symbols of information elements received, a decoding device adapted for generating a received stream of bits by decoding each received stream of coded words, according to a decoding corresponding to a coding implemented based upon coded and modulated serial digital transmission of the noisy channel, a performance prediction device adapted for formulating at least one value representative of an error rate ER of the received stream of bits, without carrying out the decoding, on the basis of the digital data which are stored allowing to associate a value of transmission quality with the information elements received, a module for predicting performance of the noisy channel being adapted for:

in a first step, formulating for each value of said transmission quality a mutual information value $I_k$ according to a predetermined function of said transmission quality, wherein said device for predicting performance of the noisy channel is adapted to use by way of value of transmission quality an equivalent signal to noise plus interference ratio calculated as a function of said equalization on a basis of various values of signal to noise ratio of the noisy channel which are measured for the temporal symbols of the information elements received of the received signal corresponding to one and the same information element and according to interference due to said waveform; and providing said value of transmission quality as a performance prediction of the transmission on the noisy channel.

16. A system for generating and processing coded and modulated serial digital transmission on a noisy channel with non-stationary attenuation between:

a transmitter comprising:

a coding device adapted for generating, based on a received stream of bits to be transmitted at least one transmitted stream of coded words resulting from the coding, according to at least one predetermined coding, of said sent stream of bits, a modulation device adapted for generating at least one transmitted stream of modulated information elements according to a predetermined modulation scheme, on at least one carrier signal, each transmitted stream of modulated information elements being representative of at least one part of each sent stream of coded words, a device for transmitting, on the noisy channel with non-stationary attenuation, a transmitted signal incorporating a stream of temporal symbols of information elements corresponding to data to be transmitted, each information element being represented by a plurality of temporal symbols, the transmitted signal exhibiting a waveform chosen from a group of cyclic waveforms, comprising guard intervals repeated cyclically, and single-carrier waveforms, with fluctuations corresponding to a single carrier, and a receiver comprising:

a receiving device adapted for receiving a received signal incorporating a stream of temporal symbols of information elements corresponding to a stream of temporal symbols of information elements transmitted on said noisy channel, an equalization device applying a predetermined of equalization to the temporal symbols of information elements received, a demodulation device adapted for generating at least one received stream of coded words based on the stream of temporal symbols of information elements received, at least one decoding device adapted for generating a received stream of bits by decoding each received stream of coded words, according to a decoding corresponding to a coding implemented by the transmitter.

* * * * *

UNITED STATES PATENT AND TRADEMARK OFFICE
CERTIFICATE OF CORRECTION

PATENT NO. : 9,654,325 B2  
APPLICATION NO. : 15/029820  
DATED : May 16, 2017  
INVENTOR(S) : Benjamin Ros Page 1 of 1

It is certified that error appears in the above-identified patent and that said Letters Patent is hereby corrected as shown below:

In the Claims

In Column 24, Line 58, delete:

"$$f(u,v) = \frac{1}{M\pi(SINR_{eq})} \sum_{m=0}^{M-1} \exp\left(\frac{-(v - SINR_{eq} \times imag(S'_m))^2}{SINR_{eq}}\right),$$"

And insert:

-- $$f(u,v) = \frac{1}{M\pi(SINR_{eq})} \sum_{m=0}^{M-1} \exp(\frac{-(v - SINR_{eq} \times imag(S'_m))^2}{SINR_{eq}})$$ --

In Column 26, Line 3, delete:

"$\{B_m^{j,0}\}_{0 \leq m \leq 2^{p-1}-1}$ being a set of normalized symbols"

And insert:

-- $\{B_m^{j,1}\}_{0 \leq m \leq 2^{p-1}-1}$ being a set of normalized symbols--

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*